No. 655,715. Patented Aug. 14, 1900.
W. F. KESSLER.
FLOWER STAND.
(Application filed Feb. 7, 1900.)
(No Model.)
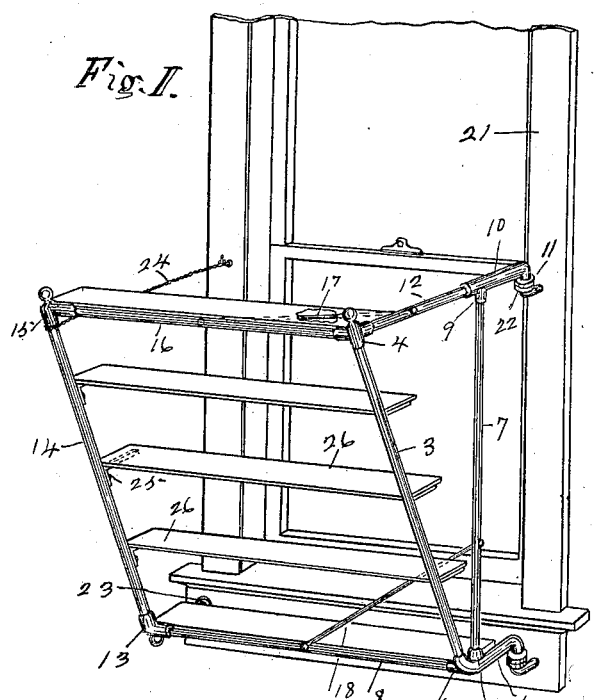
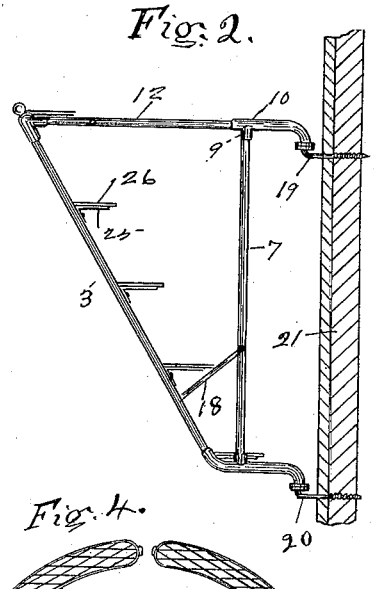
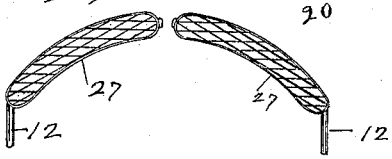
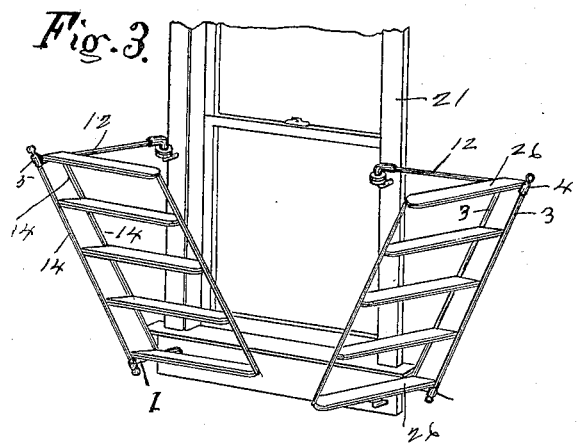
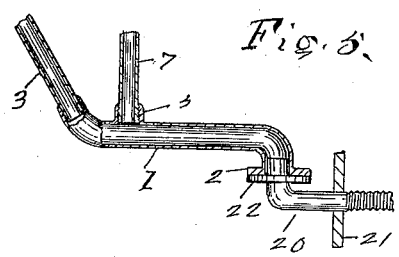
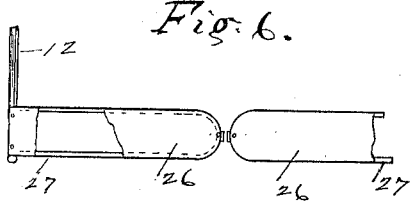
WITNESSES: Adelaide Kearns. Alice Kearns.
William F. Kessler INVENTOR
BY Chapin & Denny
His ATTORNEYS.

UNITED STATES PATENT OFFICE.

WILLIAM F. KESSLER, OF AUBURN, INDIANA.

FLOWER-STAND.

SPECIFICATION forming part of Letters Patent No. 655,715, dated August 14, 1900.

Application filed February 7, 1900. Serial No. 4,361. (No model.)

*To all whom it may concern:*

Be it known that I, WILLIAM F. KESSLER, a citizen of the United States, residing at Auburn, in the county of De Kalb, in the State of Indiana, have invented certain new and useful Improvements in Flower-Stands; and I do hereby declare that the following is a full, clear, and exact description of the invention, which will enable others skilled in the art to which it appertains to make and use the same, reference being had to the accompanying drawings, which form part of this specification.

My invention relates to improvements in flower-stands.

The object of my present improvement is to provide a neat and convenient flower-stand of simple and economical construction adapted to be pivotally and detachably mounted upon the window-casing and so arranged as to present no interference with the window-curtains and so constructed as to be readily swung around on its supporting-pivots to and from the window to facilitate watering the house-plants thereon, to keep the flowers away from undue exposure to either sun or frost, and to expose to view the contents of the stand from the inside instead of the outside of the window when desired.

In the accompanying drawings similar reference-numerals indicate like parts throughout the several views, in which—

Figure 1 is a perspective view of my invention in position upon a window-casing broken away in part. Fig. 2 is a side view of the same with the window-casing in section. Fig. 3 is a perspective view of a sectional two-part or modified form of the same. Fig. 4 is a detail plan view of a modified form of the shelves. Fig. 5 is an enlarged detail of the pivotal support and its connections, partly in longitudinal section. Fig. 6 is a detail plan, partly broken away, of that form of shelving shown in Fig. 3.

The frame of my improved flower-stand is preferably made of gas-pipe sections arranged as follows: A horizontal basal section or arm 1, Fig. 5, has its rear open end bent downwardly and provided with an annular flange 2. The forward end of this section 1 is bent upwardly and is internally screw-threaded to receive the adjacent screw-threaded end of the oblique rod 3, whose upper end is secured by a screw-threaded connection in the union 4, Fig. 1. The section 1 is also provided upon its forward end with the internally-screw-threaded bosses 5 and 6, adapted to secure the adjacent screw-threaded ends of the upright rod 7 and the horizontal rod 8, respectively. The upper end of the said rod 7 is similarly secured in the pendent boss 9 on the section 10, corresponding in construction and function to the said section 1, and has its rear end provided with an integral annular flange 11. The forward end of said section 10 is connected with the union 4 by means of the rod 12, provided at each end with a screw-threaded connection. The rod 8 has its other end secured by a screw-threaded connection in the union 13. The oblique rod 14 in parallel arrangement with the rod 3 has its lower end secured by a screw-threaded connection in the said union 13 and has its upper end similarly secured in the union 15, which in turn is connected with the union 4 by the rod 16, whose ends are also secured by a screw-threaded connection. The frame thus formed is rigidly stayed by the braces 17 and 18, Fig. 1, and is adapted to be pivotally and detachably mounted on the supporting-pivots 19 and 20, which are properly secured in the window-casing 21 and have their outer ends upwardly bent to be loosely received by the adjacent open ends of the section 1 and are provided with an annular flange 22, adapted to support and form a bearing for the annular flange 2. A pin 23, Fig. 1, may be fixed in the said window-casing in such relation to said stand as to aid in supporting the same at one limit of its swing.

The stand is rigidly secured in its normal position by means of the chain or cord 24, Fig. 1.

To the rods 3 and 14 are rigidly fixed in proper relation a series of brackets 25, on which are firmly secured in any proper manner the shelves 26. These shelves may be of wood, as shown in Figs. 1, 2, 3, and 6, in which case they may be secured to the brackets 25, as in Figs. 1 and 2, or to a metallic loop 27, as shown in Figs. 3 and 6, or these shelves may be of wire open-work, as shown in Fig. 4.

My improved stand may also be made in two sections, each section being adapted to swing freely to and from the window, as shown in Fig. 3. In this modified form the said sections when swung into position for use will have their shelves in longitudinal alinement, Fig. 6, and the inclined rods 3 and 14 are preferably duplicated.

The operation of my improvement thus described is, briefly stated, as follows: As the metallic frame has its parts united, as described, by the screw-threaded unions, it can readily be taken apart for shipment or storage and conveniently assembed for use, and when assembled it can readily be placed in position on its supporting-pivots or removed therefrom. In that form shown in Fig. 1 the stand can be readily swung rearwardly into any desired position, the weight of the stand and its contents being sufficient to secure it in such position, and when swung to its forward limit it is secured by the cord or chain 24. My improvement is thus cheap and simple in construction, can be readily and conveniently assembled for use, and requires no floor-space whatever.

Evidently my improvement can be variously modified in numerous details of construction without departing from the spirit and scope of my invention.

Having thus described my invention, what I desire to secure by Letters Patent is—

1. In a flower-stand, the combination of pivotal supporting-arms; an oblique frame detachably secured to said arms; and a series of shelves mounted on the inclined face of said frame, the said frame being adapted to swing to and from the window-casing as described.

2. In a flower-stand the combination of the pivoted arms; the skeleton frame detachably secured thereto; consisting of the horizontal rods 12, 8 and 16, the upright rods 7 and the oblique rods 3 and 14, connected as shown, and a series of shelves arranged upon the said oblique rods as described.

3. A flower-stand consisting of two swinging sections, pivotally mounted at opposite sides of the window-casing, adapted to be united as shown, each of said sections consisting of an oblique frame detachably secured to arms and provided with a series of shelves mounted on the inclined face of said frame.

Signed by me at Auburn, county of De Kalb, and State of Indiana, this 3d day of February, A. D. 1900.

WILLIAM F. KESSLER.

Witnesses:
 CHARLES M. BROWN,
 PRICE D. WEST.